US008849978B1

(12) United States Patent
Batson et al.

(10) Patent No.: US 8,849,978 B1
(45) Date of Patent: Sep. 30, 2014

(54) PROVIDING AN ENTERPRISE APPLICATION STORE

(71) Applicant: Citrix Systems, Inc., Fort Lauderdale, FL (US)

(72) Inventors: Kevin Batson, Arborfield (GB); Richard Hayton, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/015,245

(22) Filed: Aug. 30, 2013

Related U.S. Application Data

(60) Provisional application No. 61/856,930, filed on Jul. 22, 2013, provisional application No. 61/806,577, filed on Mar. 29, 2013.

(51) Int. Cl.
G06F 15/173 (2006.01)
G06F 15/16 (2006.01)
H04L 29/08 (2006.01)

(52) U.S. Cl.
CPC ..................................... *H04L 67/10* (2013.01)
USPC .......................................... 709/223; 709/248

(58) Field of Classification Search
CPC . H04L 41/0803; H04L 41/082; H04L 41/085; H04L 41/0853; H04L 41/0869
USPC .................. 709/203, 220–222, 223–229, 248
See application file for complete search history.

(56) References Cited

U.S. PATENT DOCUMENTS

| 5,805,803 | A | 9/1998 | Birrell et al. |
| 6,151,606 | A | 11/2000 | Mendez |
| 6,154,172 | A | 11/2000 | Piccionelli et al. |
| 6,609,198 | B1 | 8/2003 | Wood et al. |
| 6,621,766 | B2 | 9/2003 | Brewer et al. |
| 6,859,879 | B2 | 2/2005 | Henn et al. |
| 6,883,098 | B1 | 4/2005 | Roman et al. |
| 7,043,453 | B2 | 5/2006 | Stefik et al. |
| 7,159,120 | B2 | 1/2007 | Muratov et al. |
| 7,240,015 | B1 | 7/2007 | Karmouch et al. |
| 7,254,831 | B2 | 8/2007 | Saunders et al. |
| 7,269,605 | B1 | 9/2007 | Nguyen et al. |
| 7,340,772 | B2 | 3/2008 | Panasyuk et al. |

(Continued)

FOREIGN PATENT DOCUMENTS

| EP | 1465039 A1 | 10/2004 |
| EP | 2428894 A1 | 3/2012 |

(Continued)

OTHER PUBLICATIONS

Lowe, "Application-Specific VPNs," Dec. 13, 2005.

(Continued)

*Primary Examiner* — Brendan Higa
(74) *Attorney, Agent, or Firm* — Banner & Witcoff, Ltd.

(57) ABSTRACT

Methods, systems, and computer-readable media for providing an application store are presented. In some embodiments, a request for updated policy information for at least one application may be received at an application store from a policy agent. Based on receiving the request, it may be determined, at the application store, whether one or more policies for the at least one application have been updated. Based on determining that the one or more policies for the at least one application have been updated, at least one policy update may be provided to the policy agent.

20 Claims, 9 Drawing Sheets

(56) References Cited

U.S. PATENT DOCUMENTS

| | | |
|---|---|---|
| 7,415,498 B2 | 8/2008 | Russo et al. |
| 7,490,073 B1 | 2/2009 | Qureshi et al. |
| 7,496,954 B1 | 2/2009 | Himawan et al. |
| 7,509,672 B1 | 3/2009 | Horwitz et al. |
| 7,526,800 B2 | 4/2009 | Wright et al. |
| 7,529,923 B2 | 5/2009 | Chartrand et al. |
| 7,596,593 B2 | 9/2009 | Mitchell et al. |
| 7,599,991 B2 | 10/2009 | Vargas et al. |
| 7,697,737 B2 | 4/2010 | Aull et al. |
| 7,761,523 B2 | 7/2010 | May et al. |
| 7,788,535 B2 | 8/2010 | Bussa et al. |
| 7,788,536 B1 | 8/2010 | Qureshi et al. |
| 7,865,888 B1 | 1/2011 | Qureshi et al. |
| 7,904,468 B2 | 3/2011 | Neil et al. |
| 7,950,066 B1 | 5/2011 | Zuili |
| 7,966,323 B2 | 6/2011 | Bocking et al. |
| 7,966,652 B2 | 6/2011 | Ganesan |
| 7,970,386 B2 | 6/2011 | Bhat et al. |
| 8,001,278 B2 | 8/2011 | Huggahalli et al. |
| 8,012,219 B2 | 9/2011 | Mendez et al. |
| 8,037,421 B2 | 10/2011 | Scott et al. |
| 8,051,180 B2 | 11/2011 | Mazzaferri et al. |
| 8,060,074 B2 | 11/2011 | Danford et al. |
| 8,085,891 B2 | 12/2011 | Owen |
| 8,095,786 B1 | 1/2012 | Kshirsagar et al. |
| 8,126,128 B1 | 2/2012 | Hicks, III et al. |
| 8,126,506 B2 | 2/2012 | Roundtree |
| 8,181,010 B1 | 5/2012 | Uchil et al. |
| 8,214,887 B2 | 7/2012 | Clark et al. |
| 8,238,256 B2 | 8/2012 | Nugent |
| 8,239,918 B1 * | 8/2012 | Cohen .............................. 726/1 |
| 8,272,030 B1 | 9/2012 | Annan et al. |
| 8,296,239 B2 | 10/2012 | Nonaka |
| 8,332,464 B2 | 12/2012 | Dispensa et al. |
| 8,359,016 B2 | 1/2013 | Lindeman et al. |
| 8,365,258 B2 | 1/2013 | Dispensa |
| 8,402,011 B1 | 3/2013 | Bodenhamer |
| 8,418,238 B2 | 4/2013 | Platt et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,528,059 B1 | 9/2013 | Labana et al. |
| 8,560,709 B1 | 10/2013 | Shokhor et al. |
| 8,578,443 B2 * | 11/2013 | Narain et al. ..................... 726/1 |
| 8,601,562 B2 | 12/2013 | Milas |
| 8,613,070 B1 | 12/2013 | Borzycki et al. |
| 8,650,620 B2 | 2/2014 | Chawla et al. |
| 2002/0112047 A1 | 8/2002 | Kushwaha et al. |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0131245 A1 | 7/2003 | Linderman |
| 2004/0006706 A1 | 1/2004 | Erlingsson |
| 2004/0010579 A1 | 1/2004 | Freese |
| 2004/0083273 A1 | 4/2004 | Madison et al. |
| 2004/0111640 A1 | 6/2004 | Baum |
| 2004/0205233 A1 | 10/2004 | Dunk |
| 2004/0230807 A1 | 11/2004 | Baird et al. |
| 2005/0055578 A1 | 3/2005 | Wright et al. |
| 2005/0097608 A1 | 5/2005 | Penke et al. |
| 2005/0172241 A1 | 8/2005 | Daniels et al. |
| 2005/0255838 A1 | 11/2005 | Adams et al. |
| 2005/0273592 A1 | 12/2005 | Pryor et al. |
| 2006/0075123 A1 | 4/2006 | Burr et al. |
| 2006/0085826 A1 | 4/2006 | Funk et al. |
| 2006/0094400 A1 | 5/2006 | Beachem et al. |
| 2006/0117104 A1 | 6/2006 | Taniguchi et al. |
| 2006/0120526 A1 | 6/2006 | Boucher et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0224742 A1 | 10/2006 | Shahbazi |
| 2006/0225142 A1 | 10/2006 | Moon |
| 2006/0242685 A1 | 10/2006 | Heard et al. |
| 2007/0005713 A1 | 1/2007 | LeVasseur et al. |
| 2007/0011749 A1 | 1/2007 | Allison et al. |
| 2007/0038764 A1 | 2/2007 | Maillard |
| 2007/0049297 A1 | 3/2007 | Gopalan et al. |
| 2007/0056043 A1 | 3/2007 | Onyon et al. |
| 2007/0074033 A1 | 3/2007 | Adams et al. |
| 2007/0109983 A1 | 5/2007 | Shankar et al. |
| 2007/0156897 A1 | 7/2007 | Lim |
| 2007/0180447 A1 | 8/2007 | Mazzaferri et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0214272 A1 | 9/2007 | Isaacson |
| 2007/0226225 A1 | 9/2007 | Yiu et al. |
| 2007/0226773 A1 | 9/2007 | Pouliot |
| 2008/0027982 A1 | 1/2008 | Subramanian et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0127292 A1 | 5/2008 | Cooper et al. |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163286 A1 | 7/2008 | Rudolph et al. |
| 2008/0196038 A1 | 8/2008 | Antonio et al. |
| 2008/0209506 A1 | 8/2008 | Ghai et al. |
| 2008/0214300 A1 | 9/2008 | Williams et al. |
| 2008/0235760 A1 | 9/2008 | Broussard et al. |
| 2008/0313648 A1 | 12/2008 | Wang et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037976 A1 | 2/2009 | Teo et al. |
| 2009/0077638 A1 | 3/2009 | Norman et al. |
| 2009/0119773 A1 | 5/2009 | D'Amore et al. |
| 2009/0170532 A1 | 7/2009 | Lee et al. |
| 2009/0172789 A1 | 7/2009 | Band et al. |
| 2009/0178111 A1 | 7/2009 | Moriconi et al. |
| 2009/0199277 A1 | 8/2009 | Norman et al. |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 * | 10/2009 | Caunter et al. ................ 719/315 |
| 2009/0325615 A1 | 12/2009 | McKay et al. |
| 2010/0077469 A1 | 3/2010 | Furman et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0146523 A1 | 6/2010 | Brigaut et al. |
| 2010/0150341 A1 | 6/2010 | Dodgson et al. |
| 2010/0154025 A1 | 6/2010 | Esteve Balducci et al. |
| 2010/0192212 A1 | 7/2010 | Raleigh |
| 2010/0229197 A1 * | 9/2010 | Yi et al. .......................... 725/40 |
| 2010/0248699 A1 * | 9/2010 | Dumais ..................... 455/414.1 |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0319053 A1 | 12/2010 | Gharabally |
| 2010/0325097 A1 | 12/2010 | Er et al. |
| 2011/0145833 A1 | 6/2011 | De Los Reyes et al. |
| 2011/0154477 A1 | 6/2011 | Parla et al. |
| 2011/0179484 A1 | 7/2011 | Tuvell et al. |
| 2011/0208838 A1 | 8/2011 | Thomas et al. |
| 2011/0209064 A1 | 8/2011 | Jorgensen et al. |
| 2011/0219124 A1 | 9/2011 | Allen et al. |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0258301 A1 | 10/2011 | McCormick et al. |
| 2011/0271279 A1 | 11/2011 | Pate |
| 2011/0276683 A1 | 11/2011 | Goldschlag et al. |
| 2011/0276699 A1 | 11/2011 | Pedersen |

(56) References Cited

U.S. PATENT DOCUMENTS

| | | | |
|---|---|---|---|
| 2011/0295970 A1 | 12/2011 | Miyazawa | |
| 2012/0005476 A1 | 1/2012 | Wei et al. | |
| 2012/0005724 A1 | 1/2012 | Lee | |
| 2012/0005745 A1 | 1/2012 | Wei et al. | |
| 2012/0005746 A1 | 1/2012 | Wei et al. | |
| 2012/0023506 A1 | 1/2012 | Maeckel et al. | |
| 2012/0036347 A1 | 2/2012 | Swanson et al. | |
| 2012/0036370 A1 | 2/2012 | Lim et al. | |
| 2012/0052954 A1 | 3/2012 | Zhu et al. | |
| 2012/0066691 A1 | 3/2012 | Branton | |
| 2012/0079475 A1 | 3/2012 | Hicks, III et al. | |
| 2012/0084184 A1 | 4/2012 | Raleigh et al. | |
| 2012/0088540 A1 | 4/2012 | Smith et al. | |
| 2012/0096533 A1 | 4/2012 | Boulos et al. | |
| 2012/0109384 A1 | 5/2012 | Stepanian | |
| 2012/0117622 A1 | 5/2012 | Gronholm et al. | |
| 2012/0129503 A1 | 5/2012 | Lindeman et al. | |
| 2012/0131116 A1 | 5/2012 | Tu et al. | |
| 2012/0131685 A1 | 5/2012 | Broch et al. | |
| 2012/0154413 A1 | 6/2012 | Kim et al. | |
| 2012/0157165 A1 | 6/2012 | Kim et al. | |
| 2012/0157166 A1 | 6/2012 | Kim et al. | |
| 2012/0159139 A1 | 6/2012 | Kim et al. | |
| 2012/0165075 A1 | 6/2012 | Kim et al. | |
| 2012/0166524 A1 | 6/2012 | Watakabe et al. | |
| 2012/0166997 A1 | 6/2012 | Cho et al. | |
| 2012/0167118 A1 | 6/2012 | Pingili et al. | |
| 2012/0179802 A1 | 7/2012 | Narasimhan et al. | |
| 2012/0179909 A1 | 7/2012 | Sagi et al. | |
| 2012/0185910 A1 | 7/2012 | Miettinen et al. | |
| 2012/0185913 A1 | 7/2012 | Martinez et al. | |
| 2012/0198570 A1 | 8/2012 | Joa et al. | |
| 2012/0204220 A1 | 8/2012 | Lavi | |
| 2012/0214472 A1 | 8/2012 | Tadayon et al. | |
| 2012/0222120 A1 | 8/2012 | Rim et al. | |
| 2012/0238257 A1 | 9/2012 | Anson | |
| 2012/0240183 A1 | 9/2012 | Sinha | |
| 2012/0254768 A1 | 10/2012 | Aggarwal et al. | |
| 2012/0272221 A1 | 10/2012 | Pessoa et al. | |
| 2012/0278454 A1 | 11/2012 | Stewart et al. | |
| 2012/0284325 A1 | 11/2012 | Erb | |
| 2012/0284779 A1 | 11/2012 | Ingrassia, Jr. et al. | |
| 2012/0290694 A9 | 11/2012 | Marl et al. | |
| 2012/0303476 A1* | 11/2012 | Krzyzanowski et al. | 705/26.5 |
| 2012/0303778 A1 | 11/2012 | Ahiska et al. | |
| 2012/0304310 A1* | 11/2012 | Blaisdell | 726/28 |
| 2012/0311154 A1 | 12/2012 | Morgan | |
| 2012/0311659 A1 | 12/2012 | Narain et al. | |
| 2012/0324568 A1 | 12/2012 | Wyatt et al. | |
| 2012/0331527 A1 | 12/2012 | Walters et al. | |
| 2012/0331528 A1 | 12/2012 | Fu et al. | |
| 2013/0002725 A1 | 1/2013 | Kim et al. | |
| 2013/0007842 A1 | 1/2013 | Park et al. | |
| 2013/0013653 A1 | 1/2013 | Thompson | |
| 2013/0013688 A1 | 1/2013 | Wang et al. | |
| 2013/0014239 A1 | 1/2013 | Pieczul et al. | |
| 2013/0024424 A1 | 1/2013 | Prahlad et al. | |
| 2013/0024928 A1 | 1/2013 | Burke et al. | |
| 2013/0042294 A1 | 2/2013 | Colvin et al. | |
| 2013/0054922 A1 | 2/2013 | Tuch et al. | |
| 2013/0054962 A1 | 2/2013 | Chawla et al. | |
| 2013/0055378 A1 | 2/2013 | Chang et al. | |
| 2013/0059284 A1* | 3/2013 | Giedgowd et al. | 434/365 |
| 2013/0066960 A1 | 3/2013 | Fieremans et al. | |
| 2013/0074142 A1 | 3/2013 | Brennan et al. | |
| 2013/0084847 A1 | 4/2013 | Tibbitts et al. | |
| 2013/0086684 A1 | 4/2013 | Mohler | |
| 2013/0091543 A1 | 4/2013 | Wade et al. | |
| 2013/0097421 A1 | 4/2013 | Lim | |
| 2013/0111540 A1 | 5/2013 | Sabin | |
| 2013/0117240 A1 | 5/2013 | Taylor et al. | |
| 2013/0117805 A1* | 5/2013 | Kent et al. | 726/1 |
| 2013/0130651 A1 | 5/2013 | Deasy et al. | |
| 2013/0130652 A1 | 5/2013 | Deasy et al. | |
| 2013/0132457 A1 | 5/2013 | Diwakar | |
| 2013/0132941 A1 | 5/2013 | Lindeman et al. | |
| 2013/0133061 A1 | 5/2013 | Fainkichen et al. | |
| 2013/0138766 A1 | 5/2013 | Draluk et al. | |
| 2013/0138810 A1 | 5/2013 | Binyamin et al. | |
| 2013/0139241 A1 | 5/2013 | Leeder | |
| 2013/0142043 A1 | 6/2013 | Tapia et al. | |
| 2013/0145448 A1 | 6/2013 | Newell | |
| 2013/0151598 A1 | 6/2013 | Fu et al. | |
| 2013/0171967 A1 | 7/2013 | Ashour et al. | |
| 2013/0219176 A1 | 8/2013 | Akella et al. | |
| 2013/0219211 A1 | 8/2013 | Gopinath et al. | |
| 2013/0219456 A1 | 8/2013 | Sharma et al. | |
| 2013/0227659 A1 | 8/2013 | Raleigh | |
| 2013/0232541 A1 | 9/2013 | Kapadia et al. | |
| 2013/0254262 A1* | 9/2013 | Udall | 709/203 |
| 2013/0254660 A1 | 9/2013 | Fujioka | |
| 2013/0254831 A1 | 9/2013 | Roach et al. | |
| 2013/0263208 A1 | 10/2013 | Challa | |
| 2013/0263209 A1 | 10/2013 | Panuganty | |
| 2013/0291052 A1 | 10/2013 | Hadar et al. | |
| 2013/0297604 A1 | 11/2013 | Sutedja et al. | |
| 2013/0297662 A1 | 11/2013 | Sharma et al. | |
| 2013/0298185 A1 | 11/2013 | Koneru et al. | |
| 2013/0298201 A1 | 11/2013 | Aravindakshan et al. | |
| 2013/0298242 A1 | 11/2013 | Kumar et al. | |
| 2013/0303194 A1 | 11/2013 | Rowles | |
| 2013/0311597 A1 | 11/2013 | Arrouye et al. | |
| 2013/0318345 A1 | 11/2013 | Hengeveld | |
| 2013/0333005 A1 | 12/2013 | Kim et al. | |
| 2013/0346268 A1 | 12/2013 | Pereira et al. | |
| 2014/0006347 A1 | 1/2014 | Qureshi et al. | |
| 2014/0007183 A1 | 1/2014 | Qureshi et al. | |
| 2014/0020062 A1 | 1/2014 | Tumula et al. | |
| 2014/0020073 A1 | 1/2014 | Ronda et al. | |
| 2014/0032691 A1 | 1/2014 | Barton et al. | |
| 2014/0032733 A1 | 1/2014 | Barton et al. | |
| 2014/0032758 A1 | 1/2014 | Barton et al. | |
| 2014/0032759 A1 | 1/2014 | Barton et al. | |
| 2014/0033271 A1 | 1/2014 | Barton et al. | |
| 2014/0040638 A1 | 2/2014 | Barton et al. | |
| 2014/0040656 A1 | 2/2014 | Ho et al. | |
| 2014/0040977 A1 | 2/2014 | Barton et al. | |
| 2014/0040978 A1 | 2/2014 | Barton et al. | |
| 2014/0040979 A1 | 2/2014 | Barton et al. | |
| 2014/0059640 A9 | 2/2014 | Raleigh et al. | |
| 2014/0059642 A1 | 2/2014 | Deasy et al. | |

FOREIGN PATENT DOCUMENTS

| | | |
|---|---|---|
| GB | 2411320 A | 8/2005 |
| GB | 2462442 A | 2/2010 |
| WO | 9914652 A1 | 3/1999 |
| WO | 02084460 A2 | 10/2002 |
| WO | 2004107646 A1 | 12/2004 |
| WO | 2007113709 A1 | 10/2007 |
| WO | 2008086611 A1 | 7/2008 |
| WO | 2010115289 A1 | 10/2010 |

OTHER PUBLICATIONS

International Search Report and Written Opinion mailed Nov. 26, 2013 in Internation Application No. PCT/US2013/060388.

Xuetao Wei, et al., "Malicious Android Applications in the Enterprise: What Do They Do and How Do We Fix It?,"• ICDE Workshop on Secure Data Management on Smartphones and Mobiles, Apr. 2012, 4 pages.

Ranjan et al., "Programming Cloud Resource Orchestration Framework: Operations and Research Challenges", arvix.org, 2012, pp. 1-19.

Na et al., "Personal Cloud Computing Security Framework," 2010 IEEE Asia-Pacific Computing Conference, 2010, pp. 671-675.

Wilson et al., "Unified Security Framework", In proceedings of the 1st International Symposium on Information and Communication Technologies, pp. 500-505. Trinity College Dublin, 2003.

Mysore et al., "The Liquid Media System—a Multi-Device Streaming Media Orchestration Framework", Ubicomp 2003 Workshop, pp. 1-4.

(56) References Cited

OTHER PUBLICATIONS

Written Opinion and International Search Report, PCT/US2013/062636, Jan. 10, 2014.
International Search Report and Written Opinion dated Feb. 4, 2014 in Application No. PCT/US2013/064349.
International Search Report and Written Opinion mailed Jan. 21, 2014 in International Application No. PCT/US2013/063856.
Apple Inc., iPad User Guide for iOS 6.1 Software, Jan. 2013, Chapter 26, Accessibility, pp. 107-108.
"Citrix XenMobile Technology Overview: White Paper," Citrix White Papers online, Jul. 31, 2012, pp. 1-14; retrieved from http://insight.com/content/aam/insight/en_US/pdfs/citrix/xenmobile-tech-overview.pdf, retrieved Jan. 27, 2014.
First Office Action issued in U.S. Appl. No. 14/015,108 mailed Nov. 5, 2013.

* cited by examiner

US 8,849,978 B1

PROVIDING AN ENTERPRISE APPLICATION STORE

CROSS-REFERENCE TO RELATED APPLICATIONS

This application claims the benefit of U.S. Provisional Patent Application Ser. No. 61/856,930, filed Jul. 22, 2013, and entitled "PROVIDING AN ENTERPRISE APPLICATION STORE," and which is incorporated by reference herein in its entirety. This application also claims the benefit of U.S. Provisional Patent Application Ser. No. 61/806,577, filed Mar. 29, 2013, and entitled "SYSTEMS AND METHODS FOR ENTERPRISE MOBILITY MANAGEMENT," and which is incorporated by reference herein in its entirety.

BACKGROUND

Aspects of the disclosure relate to computer hardware and software. In particular, one or more aspects of the disclosure generally relate to computer hardware and software for providing an enterprise application store.

Increasingly, corporations and other organizations are providing and/or otherwise enabling their employees and other associates with mobile devices, such as smart phones, tablet computers, and other mobile computing devices. As these devices continue to grow in popularity and provide an increasing number of functions, many organizations may wish to place certain controls on how these devices can be used, what resources these devices can access, and how the applications running on these devices can interact with other resources.

SUMMARY

Aspects of the disclosure provide more efficient, effective, functional, and convenient ways of controlling how mobile devices can be used, what resources mobile devices can access, and how the applications running on these devices can interact with other resources. In particular, in one or more embodiments discussed in greater detail below, an enterprise application store may be implemented that can provide these and features.

For instance, in some embodiments, single sign-on (SSO) functionality may be used with an enterprise application. For example, a request for a software application may be received at an enterprise application store. Subsequently, the software application may be configured, at the enterprise application store, based on a single sign-on credential. The configured software application then may be provided, by the enterprise application store, to at least one recipient device associated with the single sign-on credential.

In other embodiments, mobile device management functionalities may be provided via an enterprise application store. For example, authentication credentials of an administrative user of an enterprise application store may be received at the enterprise application store. Based on validating the authentication credentials of the administrative user, a mobile service management interface may be provided via the enterprise application store. In addition, the mobile service management interface may include at least one control that is configured to allow the administrative user to define one or more policies to be applied to at least one application that is available in the enterprise application store.

In other embodiments, policy updates may be provided to managed applications using an enterprise application store. For example, a request for updated policy information for at least one application may be received at an enterprise application store from a policy agent. Based on receiving the request, it may be determined, at the enterprise application store, whether one or more policies for the at least one application have been updated. Based on determining that the one or more policies for the at least one application have been updated, at least one policy update may be provided to the policy agent.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing an enterprise application store. Before discussing these concepts in greater detail, however, several examples of computing architecture and enterprise mobility management architecture that may be used in implementing and/or otherwise providing various aspects of the disclosure will first be discussed with respect to FIGS. 1-4.

Computing Architecture

Figure 1:
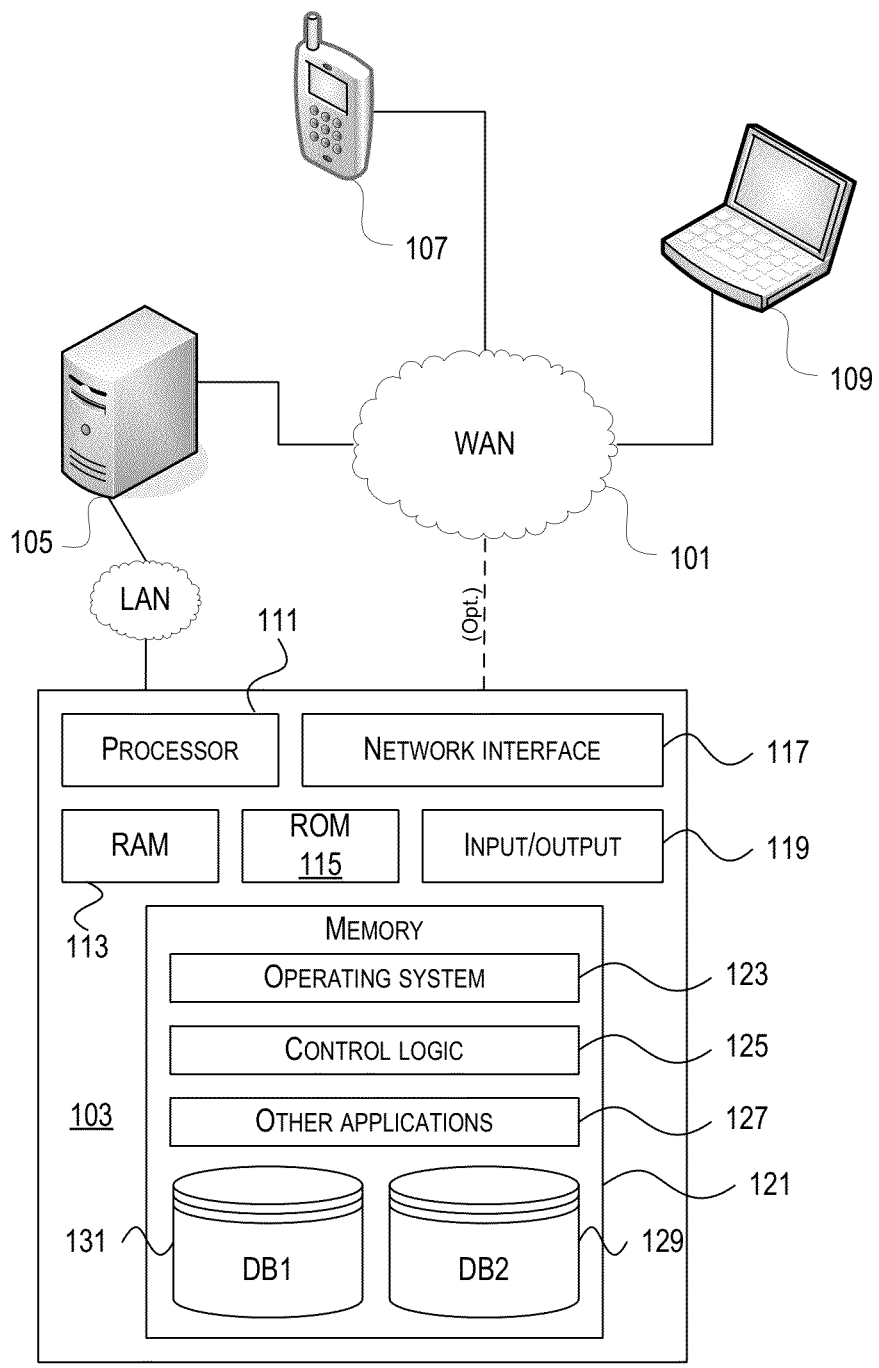
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
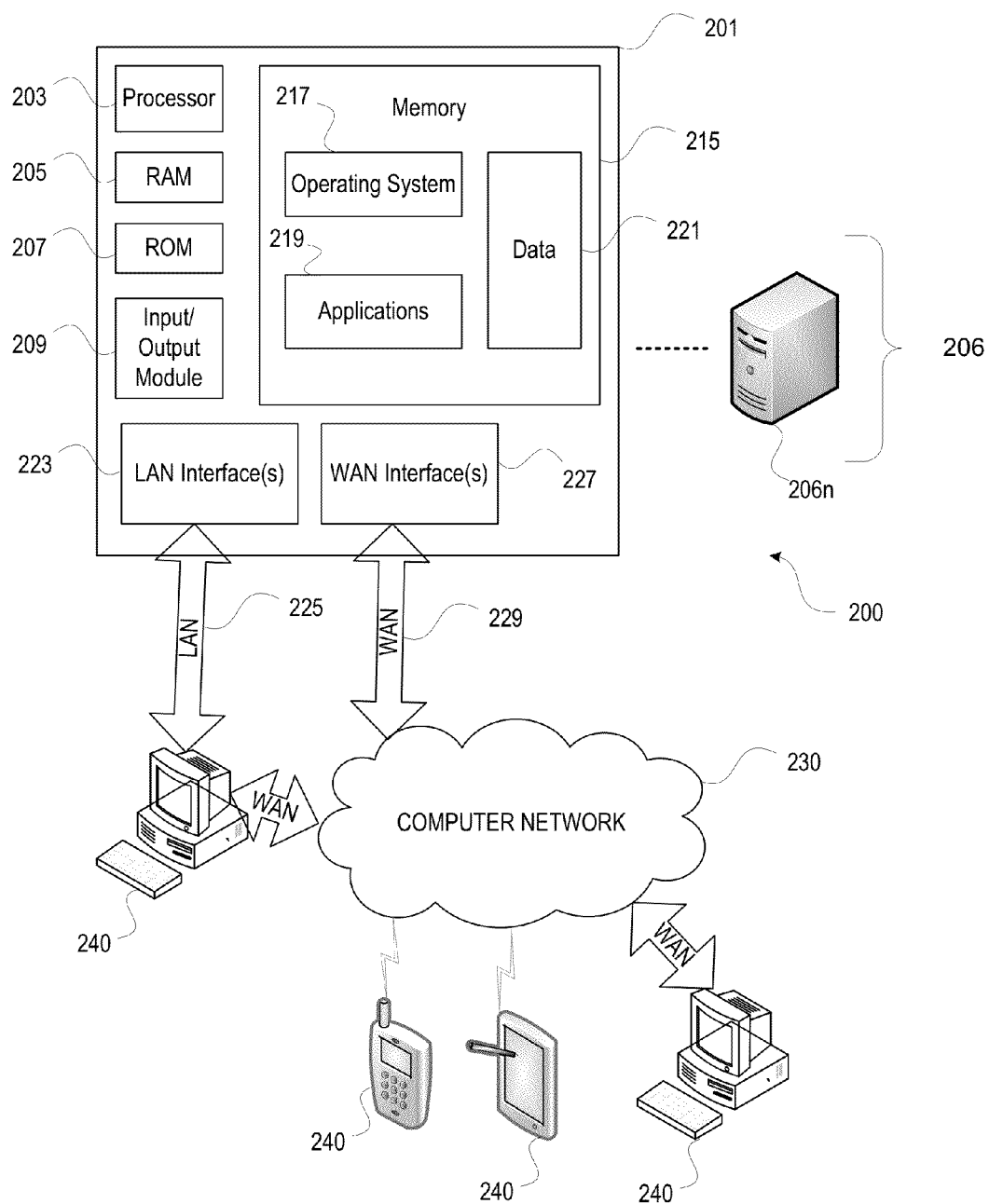
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
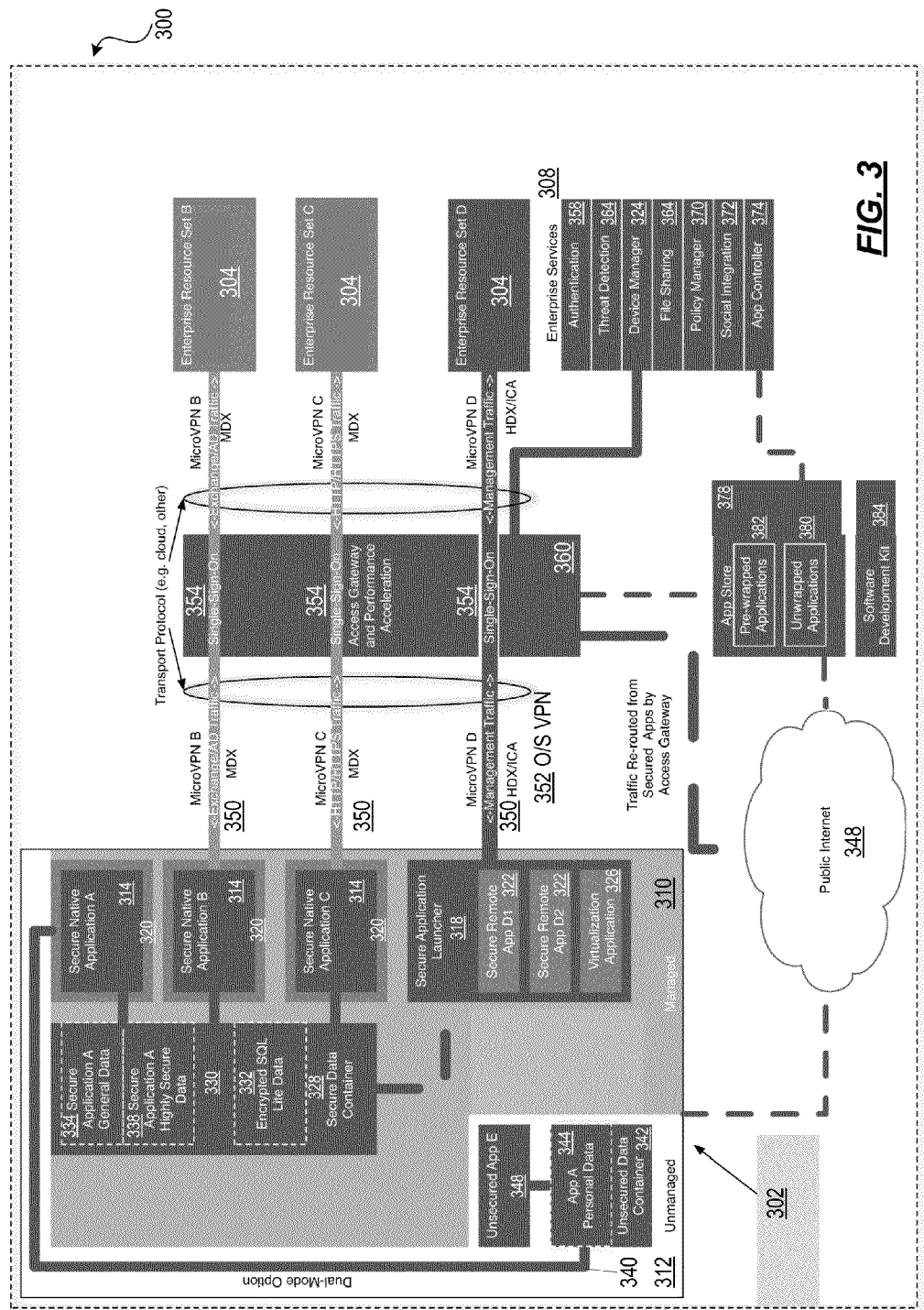
FIG. 3 depicts an illustrative enterprise mobility management system that may be used in accordance with one or more illustrative aspects described herein.

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that, for example, is purchased by the user or a mobile device 302 that is provided by the enterprise to the user. The user may utilize the mobile device 302 for business use only or for business and personal use. The mobile device may run an iOS operating system, Android operating system, and/or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies and/or other policies (e.g., mobile application management policies, other types of policies, etc.) may, for example, be referred to as an enrolled device.

The software and/or operating system of the mobile device may be separated into a managed partition 510 and an unmanaged partition 312. The managed partition 510 may have policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile device in one of the secure storage locations. An enterprise, for example, may elect to allow certain information to be stored on the device while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 324. The device manager 324 may monitor the stabilized applications and utilize techniques for detecting and remedying problems that would result in a destabilized application if such techniques were not utilized to detect and remedy the problems.

The secure applications may access data stored in a secure data container 328 in the managed partition 510 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as AES 128-bit encryption or the like, while highly secure data 338 may use a very strong form of encryption such as AES 254-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured mode. In an unsecured mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections (which may, e.g., utilize IPSEC, SSL, SOCKS, forward web proxies, and/or the like). The virtual private network connections may be specific to particular applications 350, particular devices, particular secured areas on the mobile device, and the like (e.g., 352). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single sign-on authentication processes 354. The single sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include SALESFORCE, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Additionally or alternatively, the application store 378 may include web applications, software-as-a-service (SaaS) applications, virtualized applications, and/or other types of applications and/or other resources. Applications may be populated in the application store 378 from the application controller 374. The application store 378 may be accessed by the mobile device 302 through the access gateway 360, through the public Internet 348, or the like. The application store may be provided with an intuitive and easy to use user interface. The application store 378 may provide access to a software development kit 384. The software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
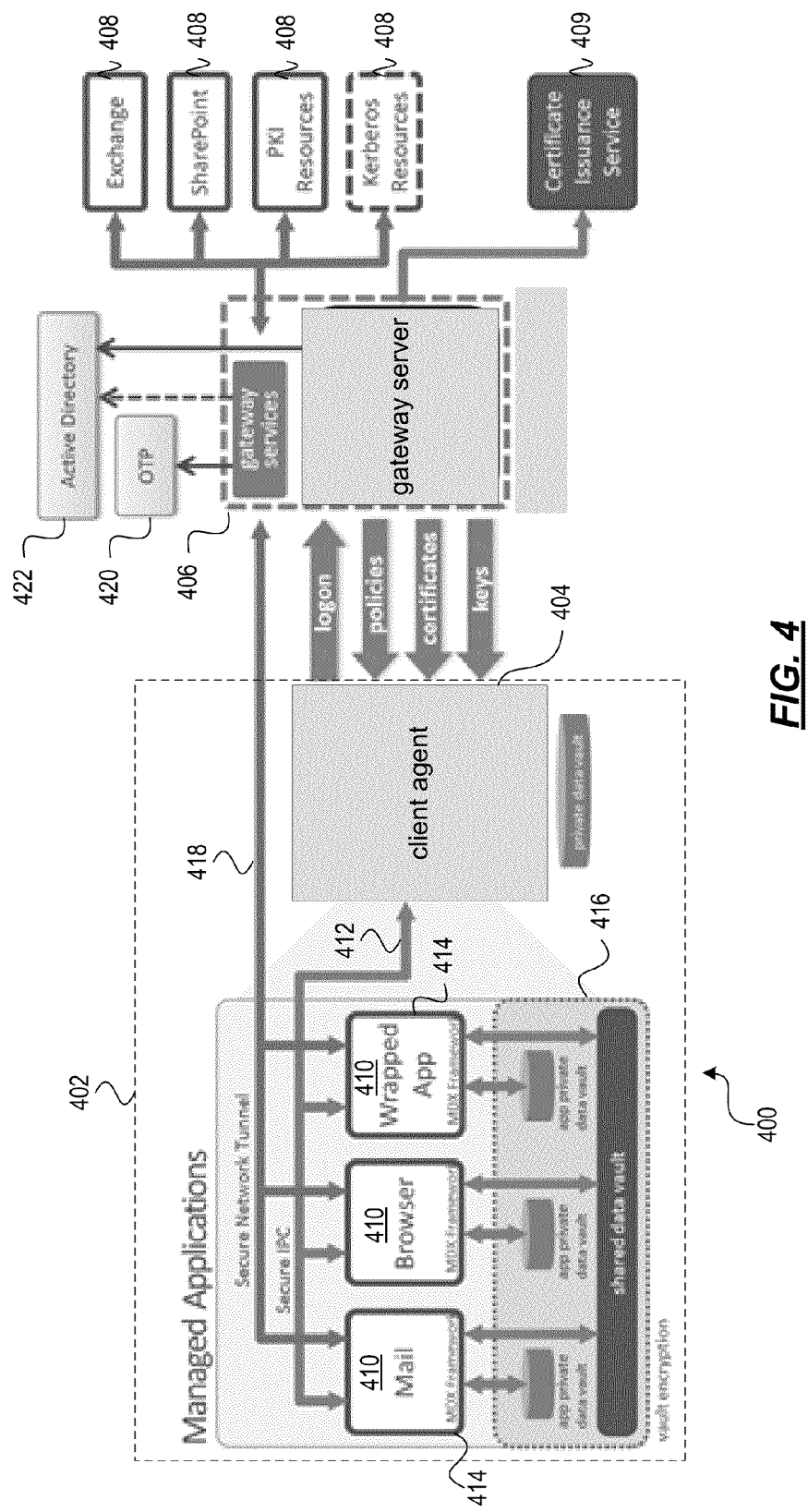
FIG. 4 depicts another illustrative enterprise mobility management system that may be used in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled mobile device 402 (e.g., a mobile device that includes one or more managed applications and/or policy management and enforcement functionalities) with a client agent 404, which interacts with gateway server 406 (which includes access gateway and application controller functionality) to access various enterprise resources 408 and services 409 such as Exchange, Sharepoint, PKI Resources, Kerberos Resources, and Certificate Issuance Service, as shown on the right hand side above. Although not specifically shown, the mobile device 402 may also interact with an enterprise application store (e.g., StoreFront) for the selection and downloading of applications. Client agent 404 may, for example, be a software application executing on a client device that facilitates communications with remote resources and/or virtualized resources. Gateway server 406 may, for example, be a server or other resource that provides access to enterprise resources and/or cloud resources.

The client agent 404 acts as the UI (user interface) intermediary for Windows apps/desktops hosted in an Enterprise data center, which are accessed using the HDX/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and the application management framework of this architecture act to provide policy driven management capabilities and features such as connectivity and SSO (single sign on) to enterprise resources/services 408. The client agent 404 handles primary user authentication to the enterprise, normally to the access gateway (AG) with SSO to other gateway server components. The client agent 404 obtains policies from gateway server 406 to control the behavior of the managed applications 410 on the mobile device 402.

The secure IPC links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through access gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The mail and browser managed applications 410 may, in some instances, have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 406 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 622 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want the enterprise application store to be accessed in this manner. In this case, the client agent 404 may require the user to set a custom offline password and the AD password is not used. Gateway server 406 and/or one or more different servers may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via a micro VPN feature which may, e.g., be provided by the application management framework). For example, an application such as @WorkMail may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

Client certificate support on iOS may rely on importing a PKCS 12 BLOB (Binary Large Object) into the iOS keychain in each managed application for each period of use. Client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to AD 622, using an AD password or trusted client certificate, and obtain Kerberos service tickets to respond to HTTP negotiate authentication challenges. The limited support feature relates to constrained delegation in AFEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of the enterprise application store and application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Enterprise Application Store Features

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing an enterprise application store. In the description below, various examples illustrating how an enterprise application store may be provide in accordance with one or more embodiments will be discussed. Additionally, in the discussion that follows, some examples involve an enterprise application store receiving and/or processing data, as well as providing other features and functionalities. In some embodiments, any and/or all of these features and functionalities may be performed and/or otherwise provided by one or more computing devices that may store and/or execute instructions in implementing and/or otherwise providing an enterprise application store.

Figure 5:
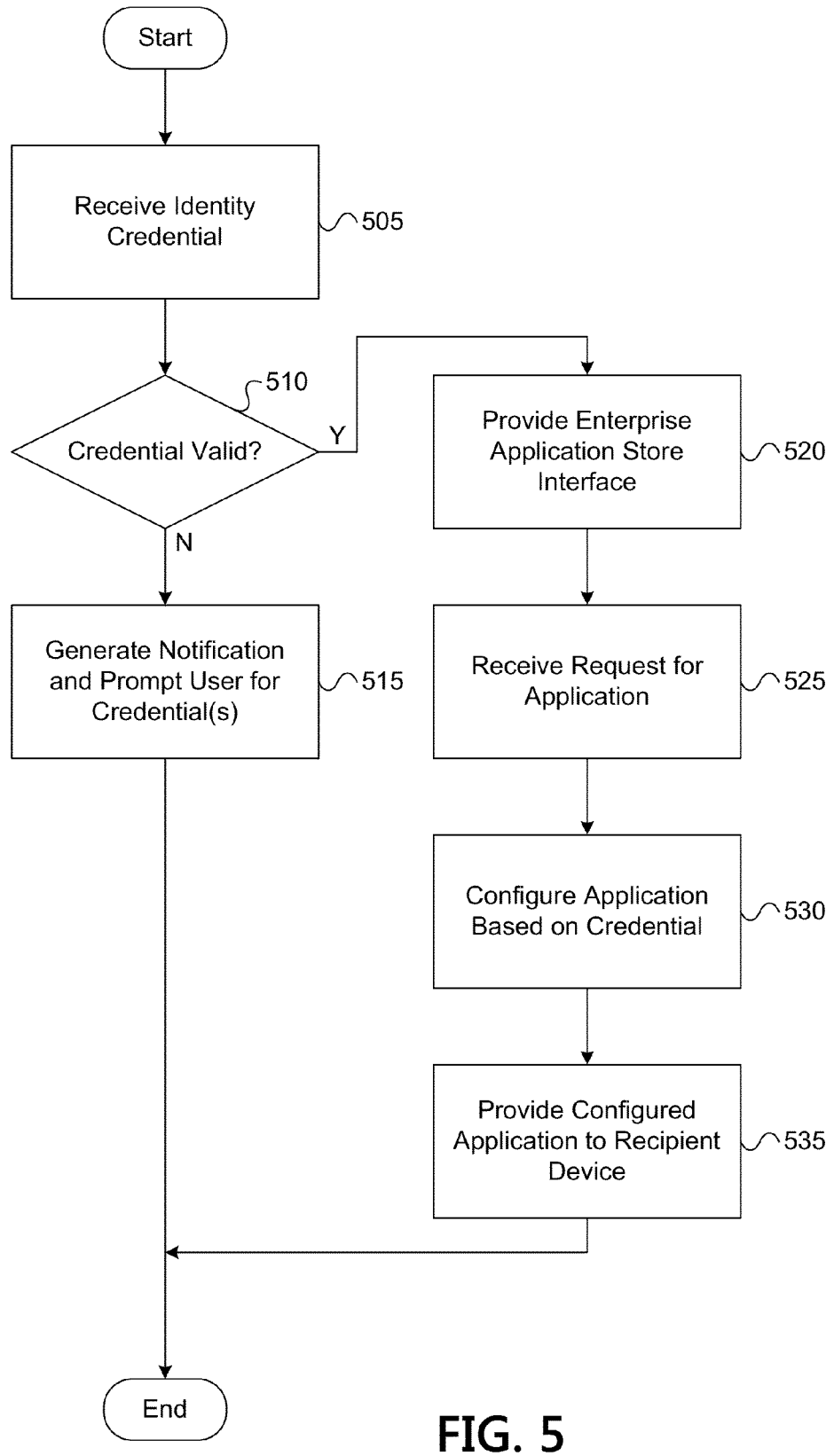
FIG. 5 depicts a flowchart that illustrates a method of using single sign-on functionality with an enterprise application store in accordance with one or more illustrative aspects discussed herein.

FIG. 5 depicts a flowchart that illustrates a method of using single sign-on functionality with an enterprise application store in accordance with one or more illustrative aspects discussed herein. In one or more embodiments, the method illustrated in FIG. 5 and/or one or more steps thereof may be performed by a computing device (e.g., generic computing device 201). In other embodiments, the method illustrated in FIG. 5 and/or one or more steps thereof may be embodied in computer-executable instructions that are stored in a computer-readable medium, such as a non-transitory computer-readable memory.

As seen in FIG. 5, the method may begin at step 505 in which an identity credential may be received at an enterprise application store. In some instances, the identity credential that is received (e.g., in step 505) may be a single sign-on (SSO) credential or some other form of multi-use credential that may, for instance, enable access to various different websites, resources, systems, and/or services. Additionally or alternatively, the identity credential (e.g., the SSO credential) may be linked to and/or otherwise associated with a particular user and/or one or more particular devices. For example, in step 505, the enterprise application store (and/or one or more computing devices that may store and/or execute instructions that provide the enterprise application store) may receive a single sign-on credential from a mobile device (and/or a user of such a mobile device) that may, for instance, be attempting to access the enterprise application store. The single sign-on credential may, for example, be an authentication credential that is configured to be used and/or capable of being used in accessing multiple different enterprise resources, including the enterprise application store and other enterprise resources, such as one or more data storage and management platforms, one or more cloud storage platforms, one or more virtualization and/or remote access platforms, and/or one or more other resources. In some instances, the single sign-on credential may additionally or alternatively be configured to be used and/or capable of being used in accessing non-enterprise resources, such as one or more unmanaged data storage and management platforms, one or more social networks, and/or one or more other non-enterprise resources.

In step 510, it may be determined whether the identity credential received in step 505 is valid. For example, in step 510, the enterprise application store may evaluate the identity credential received in step 505 (e.g., by comparing the received credential with database records and/or other information for valid credentials) to determine if the received identity credential provides the user of the credential with one or more rights to access and/or otherwise obtain information from the enterprise application store. In some instances, in evaluating the received identity credential, the enterprise application store may additionally or alternatively provide the received identity credential to one or more external credential evaluation services to be validated, and subsequently may receive, from the one or more external services, information indicating whether the received identity credential is valid or not.

If it is determined, in step 510, that the identity credential is not valid, then in step 515, a notification may be generated and/or the user may be prompted to provide alternative credentials. For example, in step 515, the enterprise application store may generate a notification indicating that the identity credential is not valid and/or that access to the enterprise application store cannot be provided. In addition, the enterprise application store may, for instance, cause the generated notification to be displayed (e.g., on the computing device from which the identity credential was received) by sending the generated notification to the computing device from which the identity credential was received. Additionally or alternatively, the enterprise application store may generate a prompt that is configured to prompt the user to provide alternative authentication credentials to obtain access to the enterprise application store. In addition, the enterprise application store may, for instance, cause the generated prompt to be displayed (e.g., on the computing device from which the identity credential was received) by sending the generated prompt to the computing device form which the identity credential was received.

Alternatively, if it is determined, in step 510, that the identity credential is valid, then in step 520, an enterprise application store interface may be provided. For example, in providing an enterprise application store interface in step 520, the enterprise application store may generate one or more user interfaces and/or cause the one or more user interfaces to be displayed (e.g., on a mobile device, such as the computing device from which the identity credential was received). In one or more arrangements, the enterprise application store interface may enable a user, such as a user of a mobile device who may be accessing the enterprise application store using his or her identity credential, to browse and/or download various applications. The enterprise application store interface may, for instance, be configured by one or more administrative users to include various features that may be specific to the organization or other enterprise that has deployed and/or is implementing the enterprise application store. For example, the enterprise application store interface may include a listing of one or more applications that are available to (and/or have been chosen, recommended, and/or licensed for) employees of the organization or enterprise (and/or other enterprise users who may be otherwise affiliated with the organization or enterprise). In addition, the one or more applications that are presented to a particular user (e.g., in a listing of applications included in the enterprise application store interface) may be selected by the enterprise application store based on the identity of the user (e.g., as may be determined based on the identity credential received in step 505). In some instances, an enterprise application store interface that is presented to a first user by an enterprise application store (which may, e.g., be provided by a first organization to employees and/or other users affiliated with the organization) may include a first set of applications, while an enterprise application store interface that is presented to a second user (who may, e.g., be different from the first user in terms of identity, role, etc.) by the enterprise application store may include a second set of applications different from the first set of applications. For instance, the second set of applications may include one or more applications that are selected by the enterprise application store for the second user based on a determination, by the enterprise application store, that the application(s) are recommended for and/or more appropriate for the second user (e.g., and perhaps not for the first user).

In step 525, a request for an application may be received. For example, in step 525, the enterprise application store may receive a request for a software application. For instance, in step 525, the enterprise application store may receive a request from a computing device (e.g., from the computing device from which the identity credential was received) to download and/or otherwise provide a particular application that is available in the enterprise application store to the computing device. Such a request may, for instance, be received based on a user of the computing device (which may, e.g., be a mobile device, such as a smart phone, tablet computer, or other mobile computing device) selecting and/or requesting to download a particular application from the enterprise application store using the enterprise application store interface provided in step 520.

In step 530, the application may be configured based on the identity credential. For example, in step 530, the enterprise application store may configure the software application (e.g., the software application request in step 525) based on the SSO credential that was received in step 505 and/or validated in step 510. In configuring the application based on the identity credential, the enterprise application store may, for instance, establish one or more user-specific settings based on the identity credential, apply one or more management policies to the application based on the identity credential, and/or otherwise modify generic and/or default settings of the application to be provided based on the identity credential (and, relatedly, based on the identity, access rights, and/or privileges of the authorized user of the identity credential), as illustrated in some of the examples discussed below.

For instance, in some embodiments, configuring the software application based on the identity credential may include establishing one or more user-specific settings based on the identity credential. For example, various application-specific settings may be defined and/or stored (e.g., for certain users with respect to various different applications) in one or more data sources, and in establishing user-specific settings, the enterprise application store may look up, access, and/or otherwise obtain these settings from the one or more data sources using the received and/or validated identity credential. For instance, the enterprise application store may use the received and/or validated identity credential to authenticate with the one or more data sources and to identify the particular user's application-specific settings (e.g., based on the user identity as determined from the identity credential) in the one or more data sources.

Some examples of the user-specific settings that may be established by the enterprise application store based on an identity credential include user account settings that may be set for a particular application (e.g., an email client, a web browser, document management software, etc.), network and/or connection settings that may be set for a particular application (e.g., an email client, a web browser, etc.), custom dictionary settings that may be set for a particular application (e.g., a word processor, an email client, etc.), custom view and/or display settings that may be set for a particular application (e.g., a word processor, a spreadsheet tool, an email client, document management software, etc.). Other examples of the user-specific settings that may be established by the enterprise application stored based on an identity credential include user interface settings (e.g., color settings, theme settings, etc.), language settings, time zone settings, currency settings, and/or other settings. While these examples illustrate some of the types of settings that may be established in some embodiments, as well as some of the types of applications for which some settings may be established, in additional and/or alternative embodiments, any other types of user-specific settings may be established for any of these and/or other types of applications.

In some embodiments, configuring the software application based on the identity credential may include applying one or more management policies to the application based on the identity credential. For example, the one or more management policies may be configured to enable and/or disable certain features of an application (e.g., cut, copy, paste, etc.) in all or certain circumstances, enable and/or disable certain features of a device (e.g., usage of a built-in camera) in all or certain circumstances, enable and/or disable access to certain resources (e.g., enterprise resources) by an application and/or a device in all or certain circumstances, and/or provide other functionalities and/or limitations with respect to a particular application and/or a device (e.g., geographic limitations on use, temporal limitations on use, etc.).

In one or more arrangements, various user-specific management policies may be defined and/or stores (e.g., for certain users with respect to various different applications) in one or more data sources, and in applying one or more management policies to an application based on an identity credential, the enterprise application store may look up, access, and/or otherwise obtain these management policies from the one or more data sources using the received and/or validated identity credential. For instance, the enterprise application store may use the received and/or validated identity credential to authenticate with the one or more data sources and to identify, using information obtained from the one or more data sources, the one or more management policies that may be applicable to a particular user with respect to a particular application.

In some instances, the one or more management policies that are applied to the application may be selected based on at least one user role associated with the identity credential. For example, if the identity credential that is received and/or validated corresponds to a first user having a first role (e.g., an information security role in an organization), the enterprise application store may apply a first set of management policies to an application requested by the first user, whereas if the identity credential that is received and/or validated corresponds to a second user having a second role (e.g., a sales role in the organization), the enterprise application store may apply a second set of management policies to the same application when it is requested by the second user, where the second set of management policies is different from the first set of management policies.

In some embodiments, in configuring the software application based on the identity credential, the application store may access one or more enterprise resources using the received and/or validated identity credential, obtain user-specific information from the one or more enterprise resources based on the identity credential, and use the user-specific information in establishing one or more user-specific settings for the software application. For example, the one or more enterprise resources may store and/or maintain user-specific settings for various applications, such as those discussed in the examples above (e.g., user account settings, network and/or connection settings, etc.). In obtaining user-specific information from the enterprise resources, the enterprise application store may use the identity credential to log into the enterprise resources and subsequently look up and retrieve the user-specific settings based on identity information associated with the identity credential. Then, in using the user-specific information in establishing the user-specific settings, the enterprise application store may set, define, overwrite, and/or modify one or more undefined and/or default settings in the application that has been requested (e.g., by the user who supplied the identity credential), prior to the application being provided to a recipient device (e.g., the user's computing device).

In some embodiments, in configuring the software application based on the identity credential, the application store may minimally configure an application, and subsequently, in providing the application to the recipient device, the application store may provide the minimally configured application to the recipient device. In some instances, a minimally configured application may be an application that has not been fully configured by the enterprise application store before it is provided to the recipient device. In other instances, in minimally configuring the application, the application store may, for example, establish one or more settings that may be essential to enabling functionality of the application (e.g., network and/or connection settings for a browser application or email client application) without establishing one or more settings that may be non-essential to enabling such functionality (e.g., color theme settings and/or other user interface settings for the browser application or email client application). In one or more arrangements, the non-essential settings instead may be established (and the applying may be fully configured) on the recipient device at runtime (e.g., when the application is executed, for instance, on the mobile device) and/or after runtime (e.g., as may be needed as a particular aspect of the application is invoked).

Continuing to refer to FIG. 5, in step 535, the configured application may be provided to a recipient device. For example, after configuring the application based on the identity credential in step 530, the enterprise application store may, in step 535, provide the configured software application to at least one recipient device associated with the identity credential. For instance, the enterprise application store may provide the configured software application to the device from which the request was received (e.g., in step 525).

In some embodiments, the configured software application that is provided to the recipient device (e.g., in step 535) may be a stub application that corresponds to a virtualized application. For example, the stub application may provide a container or a client agent (which may, e.g., be provided on a user computing device) for a virtualized application that is executed on one or more remote servers and/or devices. In configuring such a stub application, the enterprise application store may establish one or more settings that facilitate execution of the virtualized application for the particular user (e.g., user account settings for the virtualized application and/or a virtualization platform, network and/or connecting settings for the virtualized application and/or a virtualization platform, etc.). Additionally, in some instances, execution of the virtualized application may be enabled by the identity credential. For example, execution of the virtualized application may be initiated with and/or dependent upon successful authentication of the user with the identity credential, and in configuring the stub application before providing it to the recipient device (e.g., in step 530), the enterprise application store may establish one or more settings and/or otherwise store data in connection with the application indicating that the application was downloaded and/or configured based on the user's identity credential being received and validated by the enterprise application store. In some instances, the virtualization platform may then use these settings and/or stored data in authenticating the user upon launching of the stub application, which may enhance user experience as the user might not need to resubmit their identity credential and log on if the virtualization platform can use these settings and/or the stored data to authenticate the user and initiate execution of the virtualized application.

In some embodiments, the enterprise application store may configure the software application in response to validating the identity credential. For example, in instances in which the enterprise application store determines that certain devices and/or users are in need of certain applications (e.g., based on download history information for various applications and users, based on update and/or version history information for various applications and/or users, based on information provided by on-device monitoring agents for various devices and/or users, etc.), the enterprise application store may automatically provide the one or more needed applications to a particular device and/or user responsive to validation of an identity credential submitted by the particular device and/or user (e.g., without the user of such a device manually selecting to download the particular needed applications).

Figure 6:
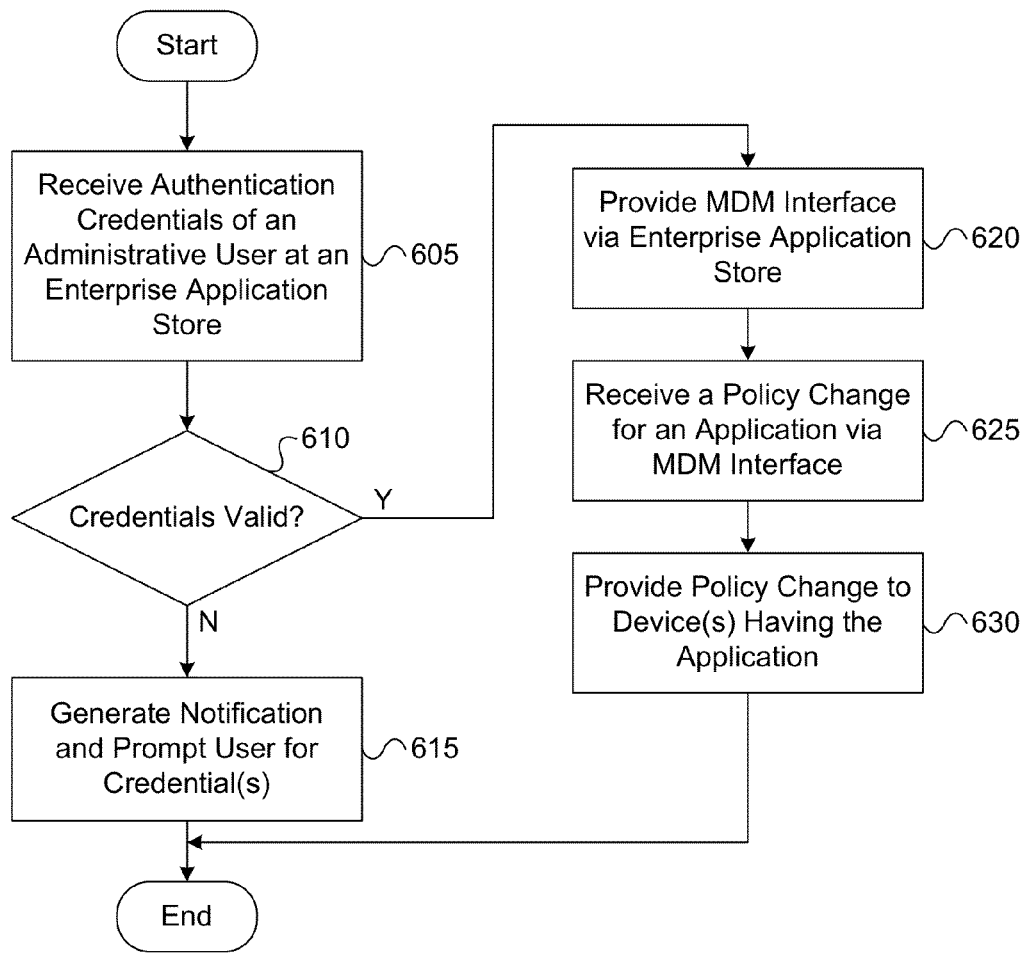
FIG. 6 depicts a flowchart that illustrates a method of providing mobile service management functionalities via an enterprise application store in accordance with one or more illustrative aspects discussed herein.

FIG. 6 depicts a flowchart that illustrates a method of providing mobile service management functionalities via an enterprise application store in accordance with one or more illustrative aspects discussed herein. In one or more embodiments, the method illustrated in FIG. 6 and/or one or more steps thereof may be performed by a computing device (e.g., generic computing device 201). In other embodiments, the method illustrated in FIG. 6 and/or one or more steps thereof may be embodied in computer-executable instructions that are stored in a computer-readable medium, such as a non-transitory computer-readable memory.

According to one or more aspects, "mobile service management" (MSM) functionalities may include mobile device management (MDM) functionalities and/or mobile application management (MAM) functionalities. In some instances, providing mobile service management functionalities (e.g., via an enterprise application store) thus may include providing exclusively mobile device management functionalities. In other instances, providing mobile service management functionalities (e.g., via an enterprise application store) may include providing exclusively mobile application management functionalities. In still other instances, providing mobile service management functionalities (e.g., via an enterprise application store) may include providing both mobile device management functionalities and mobile application management functionalities.

As seen in FIG. 6, the method may begin at step 605 in which authentication credentials of an administrative user of an enterprise application store may be received at the enterprise application store. For example, in step 605, an enterprise application store, similar to the enterprise application store discussed in the examples above, may receive authentication credentials of an administrative user. The administrative user may, for instance, be a user of the enterprise application store who has access rights and/or privileges in the application store to set and/or modify policies for other users of the application store and/or other users of other enterprise resources. In addition, the credentials of the administrative user may include a username and/or a password that have been assigned to and/or are otherwise associated with the administrative user.

In step 610, it may be determined whether the authentication credentials of the administrative user are valid. For example, in step 610, the enterprise application store may evaluate the authentication credentials of the administrative user received in step 605 to determine if the credentials can be used to enable access to and/or control of the enterprise application store. In some instances, in evaluating the authentication credentials of the administrative user, the enterprise application store may, for instance, compare a username and a password included in the received credentials with a data table of valid usernames and passwords to verify the provided credentials.

If it is determined, in step 610, that the authentication credentials of the administrative user are not valid, then in step 615, a notification may be generated and/or the user may be prompted to provide alternative credentials. For example, in step 615, the enterprise application store may generate a notification indicating that the received credentials are not valid and further may cause the generated notification to be displayed, similar to how a notification may be generated and displayed in the examples discussed above (e.g., with respect to step 515). In addition, the enterprise application store may generate a prompt that is configured to prompt the user to provide alternative authentication credentials and further may cause the generated prompt to be displayed, similar to how a prompt may be generated and displayed in the examples discussed above (e.g., with respect to step 515).

Alternatively, if it is determined, in step 610, that the authentication credentials of the administrative user are valid, then in step 620, a mobile service management (MSM) interface may be provided via the enterprise application store. The mobile service management interface may, for instance, include one or more controls that are configured to allow the administrative user to define one or more policies to be applied to one or more applications that are available in the enterprise application store. For example, the one or more policies may be configured to control functionalities of one or more applications during execution of the one or more applications on one or more mobile devices. Additionally or alternatively, the one or more policies may be configured to control functionalities of a mobile device during execution of a particular application on the mobile device. In particular, for a particular user and/or a particular device, certain policies of the one or more policies (which may, e.g., be defined by the administrative user using the mobile service management interface provided in step 620) may be applied to a particular application that enable and/or disable certain features of the particular application in all or certain circumstances, enable and/or disable certain features of the particular device in all or certain circumstances, enable and/or disable access to certain resources by the particular application and/or by the particular device in all or certain circumstances, and/or provide other functionalities and/or limitations with respect to the particular application and/or the particular device. In addition, the mobile service management interface may, in some instances, be provided as a section or part of the enterprise application store (e.g., when the enterprise application store is displayed to an administrative user), while in other instances, the mobile service management interface may be provided as a separate web console that is enabled by and/or in communication with the enterprise application store and/or its associated resources.

In some embodiments, the one or more controls that are included in the mobile service management interface (e.g., the mobile service management interface provided in step 620) may be further configured to allow the administrative user to define different policies for different users of the one or more applications. For example, the one or more controls that are included in the mobile service management interface may be configured to allow the administrative user to define a first policy for a first user or group of users with respect to a particular application, and further configured to allow the administrative user to define a second policy for a second user or group of users with respect to the same application, where the second policy is different from the first policy and the second user or group of users is different from the first user or group of users.

In one or more arrangements, the one or more controls that are included in the mobile service management interface (e.g., the mobile service management interface provided in step 620) may be further configured to allow the administrative user to define different policies for different user roles. For example, using such controls, the administrative user may define, with respect to a particular application that may be available in the enterprise application store, a first policy for a first user or group of users having a first role within an enterprise (e.g., information security) and a second policy for a second user or group of users having a second role within the enterprise (e.g., sales), where the second policy is different from the first policy (e.g., in terms of the functions that are enabled and/or disabled in the application, the functions that are enabled and/or disabled on the device while the application is running, the enterprise resources and/or other resources that can and/or cannot be accessed by the application and/or while the application is running, etc.).

In some embodiments, the mobile service management interface (e.g., the mobile service management interface provided in step 620) may be provided in response to receiving one or more applications at the enterprise application store. For example, after an administrative user uploads and/or otherwise provides a particular application to the enterprise application store, the enterprise application store may provide the mobile service management interface (which may, e.g., be configured to allow the administrative user to define one or more policies for the application that has just been uploaded) responsive to receiving the application. Using these features, an administrative user of the enterprise application store may, for instance, configure an application that he or she is uploading into and/or otherwise making available in the enterprise application store for various non-administrative users of the enterprise application store. For instance, the administrative user may be able to use the mobile service management interface to initially define policies for an application that has just been uploaded to and/or otherwise added to the enterprise application store.

In some instances, after providing the mobile service management interface (e.g., in step 620), a policy change for an application may be received, in step 625, via the mobile service management interface. For example, in some instances, in step 625, the enterprise application store may receive a policy change for a particular application. Such a policy change may, for instance, be received as user input provided by the administrative user via the mobile service management interface provided in step 620 and/or the one or more controls included in the mobile service management interface.

Based on receiving such a policy change (e.g., in step 625), information associated with the policy change may be provided, in step 630, to one or more mobile devices having the application (i.e., the application for which the policy change was received). For example, in step 630, the enterprise application store may provide information specifying details of the policy change to one or more applications and/or devices that may be affected by the policy change. In some instances, before providing this information to affected applications and/or devices, the enterprise application store may identify what applications and/or devices are affected by the policy change based on download history information for various applications and users, update and/or version history information for various applications and users, on-device monitoring information for various applications and users, and policy information for various applications and users (which may, e.g., specify for particular applications and/or particular users what policies are currently in place, what policies have been previously applied, etc.).

In some embodiments, after validating the authentication credentials of the administrative user (e.g., in step 610), a new application may be received at the application store from the administrative user. For example, after validating the authentication credentials of the administrative user, the enterprise application store may receive a new application that is being uploaded to (and/or has just been uploaded to) the enterprise application store by the administrative user (and/or by one or more computing devices being used by the administrative user).

After receiving such a new application from the administrative user (and/or responsive to receiving the new application from the administrative user), the application store may prompt the administrative user to define one or more policies to be applied to the new application. For example, in prompting the administrative user to define such policies, the enterprise application store may identify one or more relevant policies for the new application. The relevant policies may, for instance, include policies that can be and/or should be applied to the new application (e.g., based on the nature of the policies, based on the nature of the application, based on one or more default policies used by the enterprise and/or other organization that is deploying and/or otherwise providing the enterprise application store, based on recommendation information provided by other administrative users, etc.). Then, after identifying one or more relevant policies for the new application, the enterprise application store may, for instance, update the mobile service management interface (which may, e.g., have been initially provided in step 620) to include at least one control configured to allow the administrative user to manage the one or more identified policies. For example, the enterprise application store may update the mobile service management interface to include one or more controls that enable the administrative user to enable and/or disable the one or more policies that were identified as being relevant, as well as set and/or modify various properties and/or settings that may be used in defining and/or enforcing these policies on various devices.

After prompting the administrative user to define one or more policies to be applied to the new application (and/or based on receiving input and/or other information from the administrative user in response to the prompt), the application store may receive at least one policy to be applied to the new application from the administrative user. For example, the enterprise application store may receive one or more selections and/or other input provided by the administrative user via the updated mobile service management interface discussed in the example above. In this way, the administrative user may, for example, be able to define one or more policies that are to be applied to a new application that the administrative user has added to the application store. In addition, the one or more policies that are defined by the administrative user may, for example, be applied to the new application if and/or when the application is provided to and/or executed by one or more recipient devices (e.g., one or more mobile devices used by non-administrative users).

Figure 7:
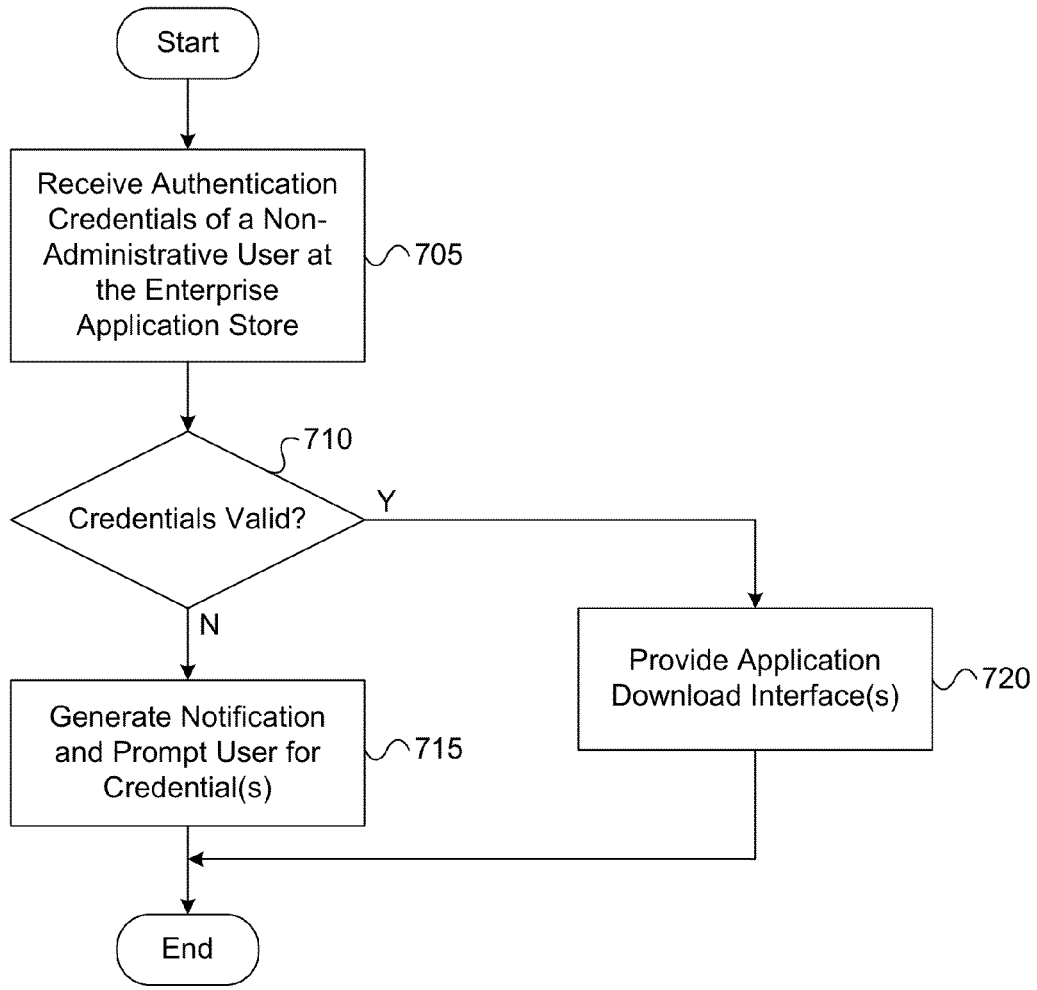
FIG. 7 depicts another flowchart that illustrates a method of providing mobile service management functionalities via an enterprise application store in accordance with one or more illustrative aspects discussed herein.

FIG. 7 depicts another flowchart that illustrates a method of providing mobile service management functionalities via an enterprise application store in accordance with one or more illustrative aspects discussed herein. In one or more embodiments, the method illustrated in FIG. 7 and/or one or more steps thereof may be performed by a computing device (e.g., generic computing device 201). In other embodiments, the method illustrated in FIG. 7 and/or one or more steps thereof may be embodied in computer-executable instructions that are stored in a computer-readable medium, such as a non-transitory computer-readable memory. Additionally or alternatively, the method illustrated in FIG. 7 may, in some instances, be combined with the method illustrated in FIG. 6. For example, the method illustrated in FIG. 7 may be performed by an enterprise application store before and/or after performing the method illustrated in FIG. 6.

As seen in FIG. 7, the method may begin in step 705, in which authentication credentials of a non-administrative user may be received at the enterprise application store. For example, in step 705, the enterprise application store may receive authentication credentials of a non-administrative user, similar to how authentication credentials of an administrative user may be received (e.g., as discussed above with respect to step 605). The authentication credentials of the non-administrative user may include a username and/or a password that have been assigned to and/or are otherwise associated with the non-administrative user. In addition, the non-administrative user may, for instance, be a user of the enterprise application store who does not have access rights and/or privileges in the application store to set and/or modify policies for himself or herself or for other users of the enterprise application store and/or for other users of other enterprise resources.

Based on receiving authentication credentials of a non-administrative user (e.g., in step 705), it may be determined, in step 710, whether the authentication credentials of the non-administrative user are valid. For example, in step 710, the enterprise application store may evaluate the authentication credentials of the non-administrative user (e.g., by comparing the provided username and password with a data table of valid usernames and passwords, etc.), similar to how the authentication credentials of the administrative user may be validated (e.g., as discussed above with respect to step 610).

If it is determined, in step 710, that the authentication credentials of the non-administrative user are not valid, then in step 715, a notification may be generated and/or the user may be prompted to provide alternative credentials. For example, in step 715, the enterprise application store may generate a notification indicating that the received credentials are not valid and further may cause the generated notification to be displayed, similar to how a notification may be generated and displayed in the examples discussed above (e.g., with respect to step 515). In addition, the enterprise application store may generate a prompt that is configured to prompt the user to provide alternative authentication credentials and further may cause the generated prompt to be displayed, similar to how a prompt may be generated and displayed in the examples discussed above (e.g., with respect to step 515).

Alternatively, if it is determined, in step 710, that the authentication credentials of the administrative user are valid, then in step 720, an application download interface may be provided. For instance, an application download interface for the application (i.e., the application for which the policy change was received in step 625) may be provided via the enterprise application store, and the application download interface may include one or more indicators corresponding to one or more policies that have been defined for the application (e.g., by the administrative user).

For example, in step 720, the enterprise application store may provide an application download interface for a particular application, and the application download interface may be customized for the particular non-administrative user that was authenticated in steps 705 and 710. In particular, the customized application download interface may include information identifying the one or more policies that are applied (or configured to be applied) to the particular application when the application is downloaded and/or used by the non-administrative user, as based on the policies and/or policy changes that have been put in place by the administrative user of the enterprise application store (e.g., using the mobile service management interface). In some instances, the application download interface thus may include simple information, such as one or more icons and/or other images, which may indicate that certain types of policies (e.g., policies limiting functions of the application itself, policies limiting functions of the device during execution of the application, etc.) are applied to or have been configured to be applied to the particular application that is the subject of the application download interface. In other instances, the application download interface may additionally or alternatively include more detailed information about the policies that are applied to or have been configured to be applied to the particular application that is the subject of the application download interface. This detailed information may, for instance, text content that explains what the policies are, what functions they enable and/or disable, in what circumstances they apply, and/or the like.

Figure 8:
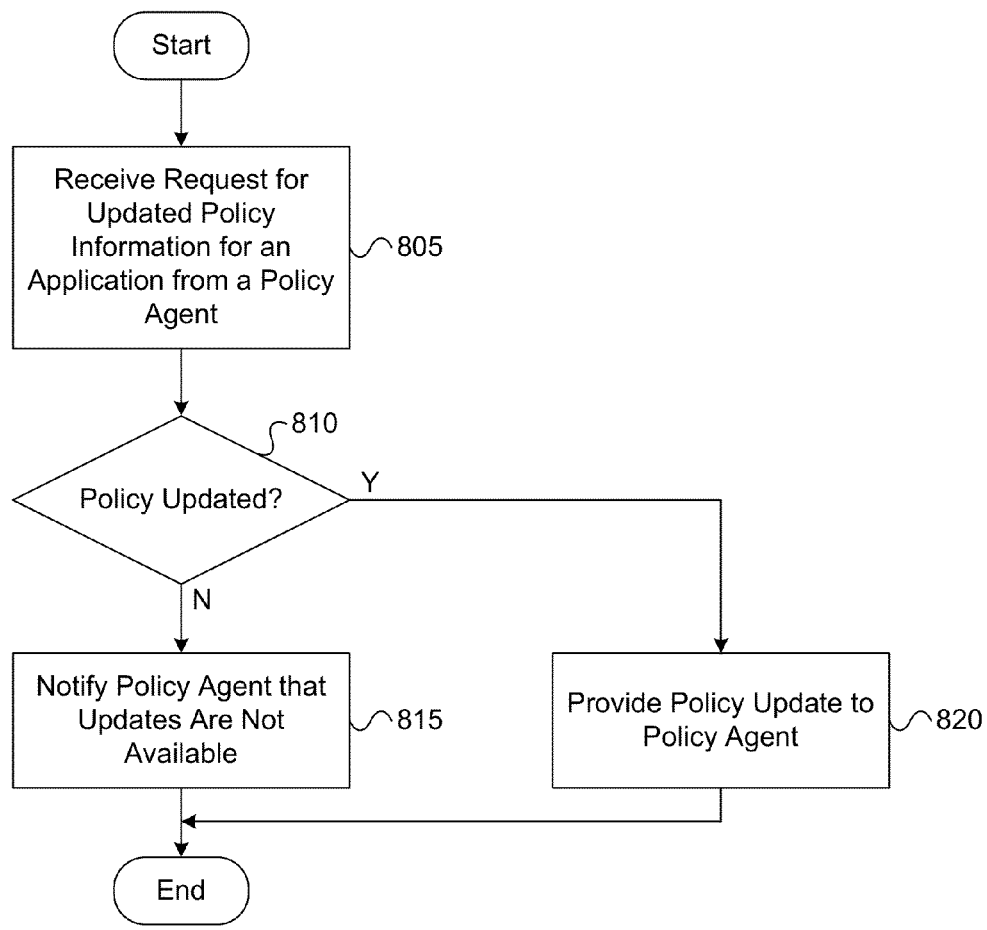
FIG. 8 depicts a flowchart that illustrates a method of providing policy updates to managed applications using an enterprise application store in accordance with one or more illustrative aspects discussed herein.

FIG. 8 depicts a flowchart that illustrates a method of providing policy updates to managed applications using an enterprise application store in accordance with one or more illustrative aspects discussed herein. In one or more embodiments, the method illustrated in FIG. 8 and/or one or more steps thereof may be performed by a computing device (e.g., generic computing device 201). In other embodiments, the method illustrated in FIG. 8 and/or one or more steps thereof may be embodied in computer-executable instructions that are stored in a computer-readable medium, such as a non-transitory computer-readable memory.

As seen in FIG. 8, the method may begin at step 805 in which a request for updated policy information for at least one application may be received at an enterprise application store from a policy agent. For example, in step 805, an enterprise application store, similar to the enterprise application store discussed in the examples above, may receive a request for updated policy information. The request may be made in connection with policies that may be applied to (or may be configured to be applied to) a particular application and may, for instance, be received from a policy agent that is resident on, being executed on, and/or is otherwise provided by a user computing device (e.g., a mobile device, such as a smart phone, a tablet computer, etc.).

In some instances, the request for updated policy information may be received (e.g., by the enterprise application store in step 805) upon execution of a wrapped application. For example, the enterprise application store may receive the request for updated policy information after a user computing device begins executing a wrapped application. Such a wrapped application may, for instance, include an enterprise application, as well as an application wrapper, that may be configured to enforce one or more policies with respect to the enterprise application and/or the device upon which the wrapped application is being executed. In addition, such an application wrapper may, for instance, implement one or more aspects of the application management framework 414 discussed above.

In some instances, the policy agent (e.g., from which the request for updated policy information is received in step 805) may be a mobile device management (MDM) policy enforcement agent (e.g., on a user computing device). Such a mobile device management policy enforcement agent may, for instance, be a separate program, process, or service that is executed on (or configured to be executed on) a user computing device and is further configured to monitor and enforce various policies with respect to various applications and the device itself.

In other instances, the policy agent (e.g., from which the request for updated policy information is received in step 805) may be an application wrapper for a particular application. For example, the policy agent may be an application wrapper for the particular application for which the request for updated policy information is received in step 805. As discussed above, such an application wrapper may be configured to enforce one or more policies with respect to the application and, in some instances, may implement one or more aspects of the application management framework 414 discussed above.

Based on receiving the request for updated policy information (e.g., in step 805), it may be determined, in step 810, whether one or more policies for the at least one application have been updated. For example, in step 810, the enterprise application store may determine one or more policies for the one or more applications (e.g., the one or more applications that are the subject of the request received in step 805) have been updated. The one or more policies for a particular application may, for instance, be updated although the application itself has not been updated (e.g., the policies can be modified independently of the application itself and/or an application wrapper that may be used to wrap the application). In one or more arrangements, the enterprise application store may determine whether policies for an application have been updated based on policy information that is stored by, maintained by, and/or accessible to the enterprise application store. In some instances, such policy information may be created, accessed, modified, and/or stored by the enterprise application store based on user input and/or other information received from an administrative user of the enterprise application store, such as information received from an administrative user of the enterprise application store via a mobile service management interface, as discussed in the examples above with respect to FIG. 6.

Continuing to refer to FIG. 8, if it is determined, in step 810, that one or more policies for the at least one application have not been updated, then in step 815, the policy agent may be notified that updates are not available. For example, in step 815, the enterprise application store may notify the policy agent that updates are not available. For instance, in step 815, the enterprise application store may send one or more messages to the user computing device (which may, e.g., have sent the request received in step 805) to inform the user computing device and/or the policy agent being executed thereon that policy updates are not available and/or that the user computing device should continue to use and/or enforce one or more policies that the policy agent has previously obtained from the enterprise application store.

Alternatively, if it is determined, in step 810, that one or more policies for the at least one application have been updated, then in step 820, at least one policy update may be provided to the policy agent. For example, in step 820, the enterprise application store may send one or more messages to the user computing device (which may, e.g., have sent the request received in step 805) to inform the user computing device and/or the policy agent being executed thereon that one or more policy updates and/or available. In addition, the one or more messages sent by the enterprise application store to the policy agent may, for instance, include information about the new and/or modified policies, where such information is configured to cause the policy agent to implement and/or enforce the new and/or modified policies (e.g., with respect to the particular applications for which policy changes have occurred and/or with respect to the device itself). As in the examples discussed above, the one or more policies may be configured to enable and/or disable certain features of the one or more applications, enable and/or disable certain features of the device, enable and/or disable access to certain resources, and/or provide other functionalities and/or limitations, and the information provided (e.g., as a policy update to the policy agent in step 820) may reflect any and/or all changes made to these and/or other types of policies.

Figure 9:
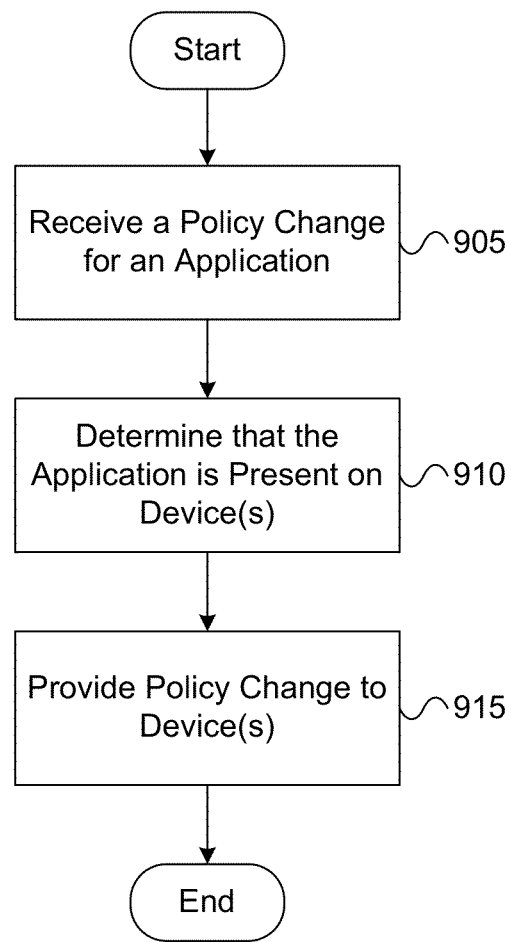
FIG. 9 depicts another flowchart that illustrates a method of providing policy updates to managed applications using an enterprise application store in accordance with one or more illustrative aspects discussed herein.

FIG. 9 depicts another flowchart that illustrates a method of providing policy updates to managed applications using an enterprise application store in accordance with one or more illustrative aspects discussed herein. In one or more embodiments, the method illustrated in FIG. 9 and/or one or more steps thereof may be performed by a computing device (e.g., generic computing device 201). In other embodiments, the method illustrated in FIG. 9 and/or one or more steps thereof may be embodied in computer-executable instructions that are stored in a computer-readable medium, such as a non-transitory computer-readable memory. Additionally or alternatively, the method illustrated in FIG. 9 may, in some instances, be combined with the method illustrated in FIG. 8. For example, the method illustrated in FIG. 9 may be performed by an enterprise application store before and/or after performing the method illustrated in FIG. 8.

As seen in FIG. 9, the method may begin in step 905, in which a policy change for an application may be received at the enterprise application store. For example, in step 905, the enterprise application store may receive a policy change for a particular application from an administrative user of the enterprise application store. Such a policy change may, for instance, be received via a mobile service management interface, as discussed above with respect to FIG. 6.

Continuing to refer to FIG. 9, in instances in which a policy change for an application is received by the enterprise application store, but a request for updated policy information has not yet been received, at least with respect to the particular application from certain devices, the enterprise application store may determine to proactively provide the policy update to the affected devices. Thus, based on receiving a policy change (e.g., in step 905), it may be determined, in step 910, that the application (i.e., the application for which a policy change was received in step 905) is present on one or more devices. For example, in step 910, the enterprise application store may determine that the application has been installed on, has been downloaded by, and/or is otherwise present on one or more particular devices. In some instances, the application store may determine that the application has been installed on, has been downloaded by, and/or is otherwise present on one or more particular devices based on download history information for various applications and users, update and/or version history information for various applications and users, and/or on-device monitoring information for various applications and users. In one or more arrangements, the download history information for various applications and users may include user-keyed application download records that indicate, for each user, the versions and names of any and/or all applications that have been downloaded by the particular user from the enterprise application store, as well as identifying information for the particular devices onto which such applications were downloaded.

Based on determining that the application is present on one or more devices (e.g., in step 910), information associated with the policy change may be provided to the one or more devices in step 915. For example, in step 915, the enterprise application store may provide information about the policy change to one or more affected devices (e.g., the one or more devices on which the application was determined to be present in step 910). For instance, in step 915, the enterprise application store may formulate and send one or more messages to the devices identified in step 910, where the one or more messages include information about the new and/or modified policies, similar to how a policy update may be provided in step 820.

As illustrated above, various aspects of the disclosure relate to providing an enterprise application store. In other embodiments, however, the concepts discussed herein can be implemented in any other type of application store, including a consumer application store. Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method, comprising:
receiving, at an application store, from a policy agent, a request for updated policy information for at least one application;
based on receiving the request, determining, at the application store, whether one or more policies for the at least one application have been updated based on policy information that is maintained by the application store and created by the application store based on input received via a mobile service management interface provided by the application store;
based on determining that the one or more policies for the at least one application have been updated, providing at least one policy update to the policy agent;
receiving, at the application store, a policy change for a first application;
determining that the first application is present on one or more devices; and
providing information associated with the policy change to the one or more devices.

2. The method of claim 1, further comprising:
based on determining that the one or more policies for the at least one application have not been updated, notifying the policy agent that updates are not available.

3. The method of claim 1, wherein the request for updated policy information is received from the policy agent upon execution of a wrapped application.

4. The method of claim 1, further comprising:
determining whether one or more policy updates are available for one or more other applications in addition to the first application on the one or more devices; and
based on determining that one or more policy updates are available for the one or more other applications, providing the one or more available policy updates for the one or more other applications to the one or more devices.

5. The method of claim 1, wherein determining that the first application is present on the one or more devices is based on one or more user-keyed application download records associated with the application store.

6. The method of claim 1, wherein the policy agent is a mobile device management policy enforcement agent.

7. The method of claim 1, wherein the policy agent is an application wrapper for the at least one application that is configured to enforce the one or more policies on the at least one application.

8. The method of claim 7,
wherein the application wrapper is configured to support use of client certificates for authentication to protected network resources, and
wherein the application wrapper is further configured to orchestrate network access on behalf of the at least one application.

9. The method of claim 1, wherein the application store maintains different policies for different users of the at least one application.

10. The method of claim 9, wherein at least one policy of the one or more policies is configured to disable access to one or more specific enterprise resources in one or more specific circumstances.

11. The method of claim 1,
wherein the mobile service management interface includes one or more controls that are configured to allow an administrative user to define one or more policies to be applied to one or more applications that are available in the application store, and wherein the application store is configured to provide an enterprise application store interface that includes one or more features specific to an enterprise that has deployed the application store, the one or more features including a listing of one or more applications that are chosen for enterprise users affiliated with the enterprise.

12. The method of claim 11, wherein the policy change for the first application is received from at least one administrative user via the mobile service management interface.

13. An apparatus, comprising:
at least one processor; and
memory storing computer-readable instructions that, when executed by the at least one processor, cause the apparatus to:
receive, at an application store, from a policy agent, a request for updated policy information for at least one application;
based on receiving the request, determine, at the application store, whether one or more policies for the at least one application have been updated based on policy information that is maintained by the application store and created by the application store based on input received via a mobile service management interface provided by the application store;
based on determining that the one or more policies for the at least one application have been updated, provide at least one policy update to the policy agent;
receive, at the application store, a policy change for a first application;
determine that the first application is present on one or more devices; and
provide information associated with the policy change to the one or more devices.

14. The apparatus of claim 13, wherein the memory stores additional computer-readable instructions that, when executed by the at least one processor, further cause the apparatus to:
based on determining that the one or more policies for the at least one application have not been updated, notify the policy agent that updates are not available.

15. The apparatus of claim 13, wherein the request for updated policy information is received from the policy agent upon execution of a wrapped application.

16. The apparatus of claim 13, wherein the memory stores additional computer-readable instructions that, when executed by the at least one processor, further cause the apparatus to:
determine whether one or more policy updates are available for one or more other applications in addition to the first application on the one or more devices; and
based on determining that one or more policy updates are available for the one or more other applications, provide the one or more available policy updates for the one or more other applications to the one or more devices.

17. The apparatus of claim 13, wherein determining that the first application is present on the one or more devices is based on one or more user-keyed application download records associated with the application store.

18. The apparatus of claim 13, wherein the policy agent is a mobile device management policy enforcement agent.

19. The apparatus of claim 13, wherein the policy agent is an application wrapper for the at least one application that is configured to enforce the one or more policies on the at least one application.

20. One or more non-transitory computer-readable media storing instructions that, when executed, cause at least one computing device to:
receive, at an application store, from a policy agent, a request for updated policy information for at least one application;
based on receiving the request, determine, at the application store, whether one or more policies for the at least one application have been updated based on policy information that is maintained by the application store and created by the application store based on input received via a mobile service management interface provided by the application store;
based on determining that the one or more policies for the at least one application have been updated, provide at least one policy update to the policy agent;
receive, at the application store, a policy change for a first application;
determine that the first application is present on one or more devices; and
provide information associated with the policy change to the one or more devices.

* * * * *